Nov. 20, 1962 — L. PRICE — 3,064,469
MOMENT DETERMINING DEVICE
Filed March 2, 1960 — 3 Sheets-Sheet 1

INVENTOR.
LEO PRICE
BY Woodling and Krost,
ATTORNEYS

Nov. 20, 1962 L. PRICE 3,064,469
MOMENT DETERMINING DEVICE

Filed March 2, 1960 3 Sheets-Sheet 2

INVENTOR.
LEO PRICE
BY
*Woodling and Krost,*
ATTORNEYS

Nov. 20, 1962 L. PRICE 3,064,469
MOMENT DETERMINING DEVICE
Filed March 2, 1960 3 Sheets-Sheet 3

INVENTOR.
LEO PRICE
BY *Woodling and Krost,*
ATTORNEYS

United States Patent Office 3,064,469
Patented Nov. 20, 1962

3,064,469
MOMENT DETERMINING DEVICE
Leo Price, Cleveland, Ohio, assignor to Winslow Manufacturing Company, a corporation of Ohio
Filed Mar. 2, 1960, Ser. No. 12,423
15 Claims. (Cl. 73—65)

The invention relates in general to a device for determining moments of objects and more particularly to a scale-like device wherein the moment of an object is determined by holding the object in a particular manner and effectively counterbalancing the weight thereof.

The moment determining device may include a pivot on a frame to pivot a beam and the object, the moment of which is to be determined, is mounted on the beam on one side of the pivot. On the other side of the pivot there is means on the beam to generally counterbalance the weight of the object and this means has a center of gravity below a horizontal line through the pivot. Movable indicator means is provided in the device which may take the form of a mechanical-electrical transducer, such as a linear variable differential transformer. Linkage means links the beam and a movable mechanical input of the indicator means and this linkage means may be in the form of a cam and follower. The electric output of the transducer is in accordance with the position of the mechanical input and indicates the moment of the object in the mounting means.

Many different objects may have the same weight but have different moments. An object, such as a turbine blade for an aircraft jet engine, needs to be precisely shaped and the weights and moments of several turbine blades on a rotor in the jet engine need to be carefully calibrated so that the rotor will be both dynamically and statically balanced. This is especially true in jet engines where high rotational speeds are encountered. Many jet engine turbine blades are hollow, and accordingly, even though the outer surface is carefully shaped to a predetermined contour, the inner surface cannot be as precisely controlled. Accordingly, two turbine blades may have the same weight but have a different moment when mounted in a rotor due to the difference in distribution of material in the turbine blade.

Accordingly, an object of the present invention is to provide a device to accurately determine the moment of an object, such as a turbine blade.

Still another object of the invention is to provide a scale-like device to not only weigh the object but to take into account the moment of the object with the average weight of a group of objects being counterbalanced.

Another object of the invention is to provide a moment determining device which has an electrical output in accordance with the moment of an object.

Another object of the invention is to provide a moment determining device which utilizes a beam scale to rapidly move to a position dependent on the moment of an object under consideration with this position being transferred mechanically by linkage means to a transducer to obtain an electrical output with an electrical indicator indicating the moment of the object.

Other objects and a fuller understanding of the invention may be had by referring to the following description and claims, taken in conjunction with the accompanying drawings, in which:

Figure 1:
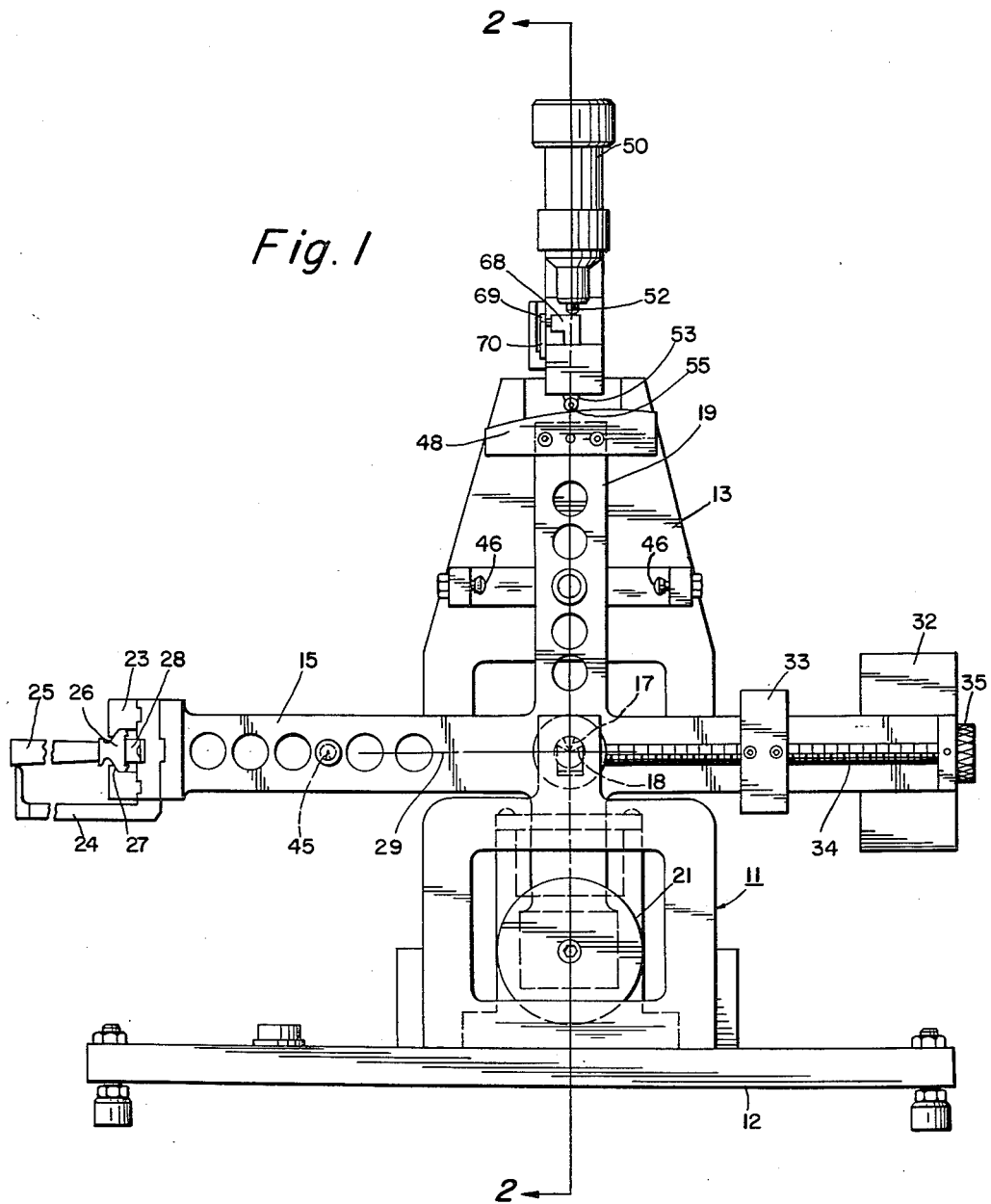
FIGURE 1 is a front elevational view of the moment determining device.
Figure 2:
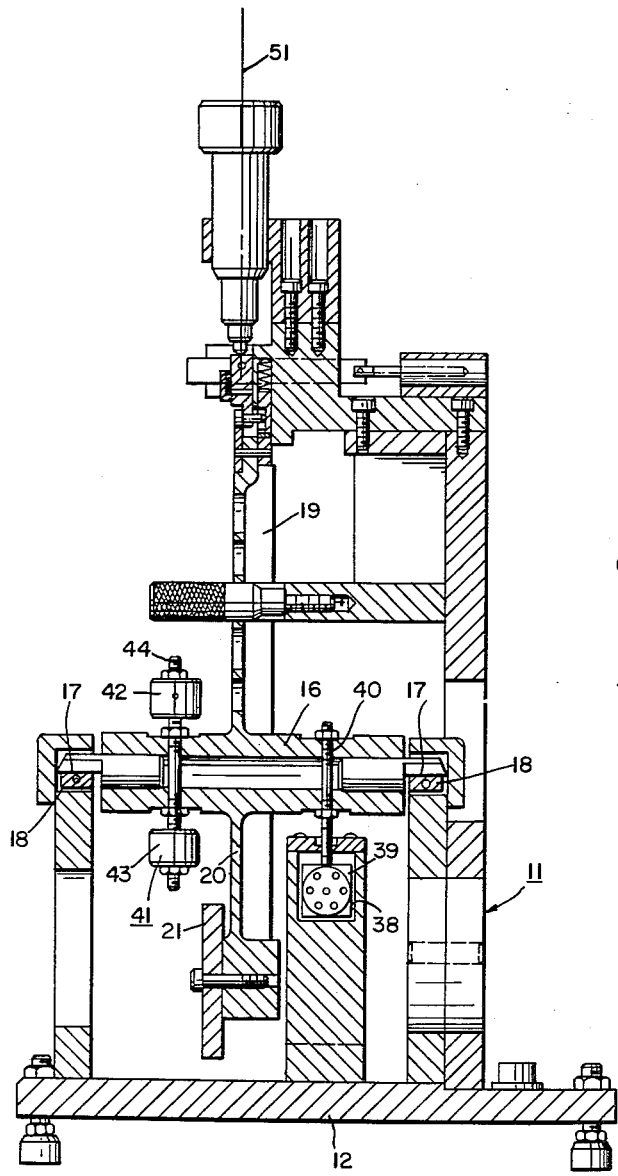
FIGURE 2 is a sectional elevational view on line 2—2 of FIGURE 1.
Figure 3:
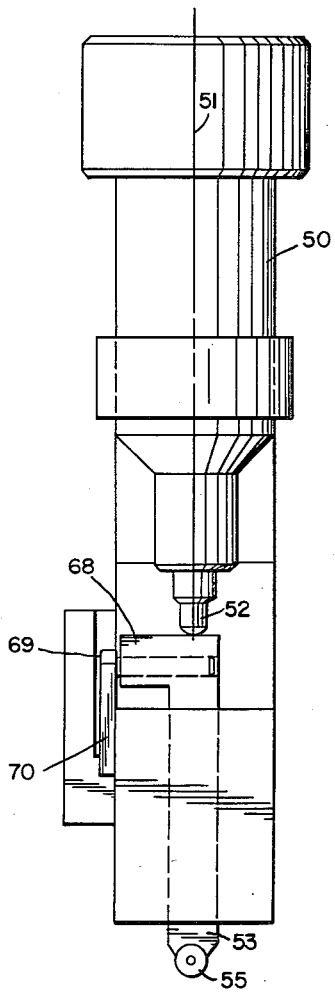
FIGURE 3 is an enlarged elevational view of part of the FIGURE 1.

The figures of the drawing show the entire moment determining device 11 which includes generally a base 12 and a column 13. The base and column together establish a frame for the entire device 11. A beam 15 has a pivot shaft 16 fixedly attached thereto and which carries knife edge pivots 17 at the two ends thereof. These knife edge pivots rest in V-shaped bearing blocks 18 mounted on the base 12. An arm 19 extends upwardly from the beam 15 and is perpendicular thereto. A pendulum arm 20 extends downwardly from the beam 15 and carries a pendulum 21. A clamp bracket 23 is mounted on one end of the beam 15 and carries a support arm 24 to support an object 25, the moment of which is to be determined. This object is shown as a turbine blade. The turbine blade has a root section 26 which is slidably inserted into a dovetail slot 27 in the clamp bracket 23. A leaf spring 28 engages the end of the turbine blade to positively hold the object 25 in a predetermined position and at a fixed distance relative to the pivot means 17—18. The support arm 24 makes certain that the longitudinal axis of the turbine blade 25 lies on a transverse axis 29, which is the axis of the beam 15.

A counterpoise 32 is fixed to the other end of the beam 15 to counterbalance the weight of the clamp bracket 23. An adjustable counterpoise 33 is carried on a transverse screw 34 to be transversely adjustable to counterbalance the median weight of a group of objects, such as the turbine blades 25. A thumb screw 35 may be used to rotate this screw 34 to adjust the transverse position of the adjustable counterpoise 33.

A dashpot chamber 38 is fixed on the base 12 and is adapted to be filled with oil. A dashpot vane 39 is disposed in the chamber 38 and is carried by a rod 40 depending from the beam pivot shaft 16. Accordingly, as the beam moves on its pivot means, the dashpot vane moves in the chamber 38 to damp this movement. An adjustable pendulum 41 is provided on the beam 15 by weights 42 and 43 threadably carried on a rod 44 extending through the pivot shaft 16. By moving these weights up and down relative to the axis 29, the effective mass of the pendulum 21 may be varied and accordingly the entire device may be calibrated. Also a knife edge calibration pivot 45 is provided on the clamp end of the beam 15 on which to mount a weight pan for calibration purposes. The column 13 carries bumpers 46 to limit the arcuate movement of the arm 19 and hence of the beam 15. A cam 48 is mounted on the upper end of the arm 19 and the surface of this cam is on a radius other than from the pivot means 17—18.

A linear variable differential transformer 50 as a transducer is mounted on the column 13 along a vertical axis 51 through the pivot means 17—18. This transducer has a movable core 52 which is a mechanical input to this mechanical-electrical transducer. A slide block 53 is mounted on the column 13 for vertical sliding movement, and the upper end 54 of this slide bears against the core 52. The lower end of this slide block 53 carries a cam follower roller 55 which is adapted to cooperate with the cam 48. The slide block 53 is urged downwardly by a spring 56 bearing against a pin 57 in the slide block 53.

An arcuate brake surface 60 is fixedly attached to the top of the arm 19 directly behind the cam 48. This arcuate brake surface is on a radius from the pivot means 17—18. A brake shoe 61 is carried in a brake plunger 62 urged downwardly by a spring 63. A slot 64 is provided in the brake plunger 62 and the shaft 65 of the cam follower roller 55 extends into this slot. This provides a lost motion connection between the slide block 53 and the brake plunger 62.

The slide block 53 has an upper lateral extension 68 carrying a lifter roller 69. A lifter cam 70 is journaled for horizontal slide movements in the column 13 and this lifter cam has a cam surface at approximately 45 degrees to the horizontal. A solenoid 71 is connected to actuate this lifter cam 70 between first and second positions.

Figure 4:
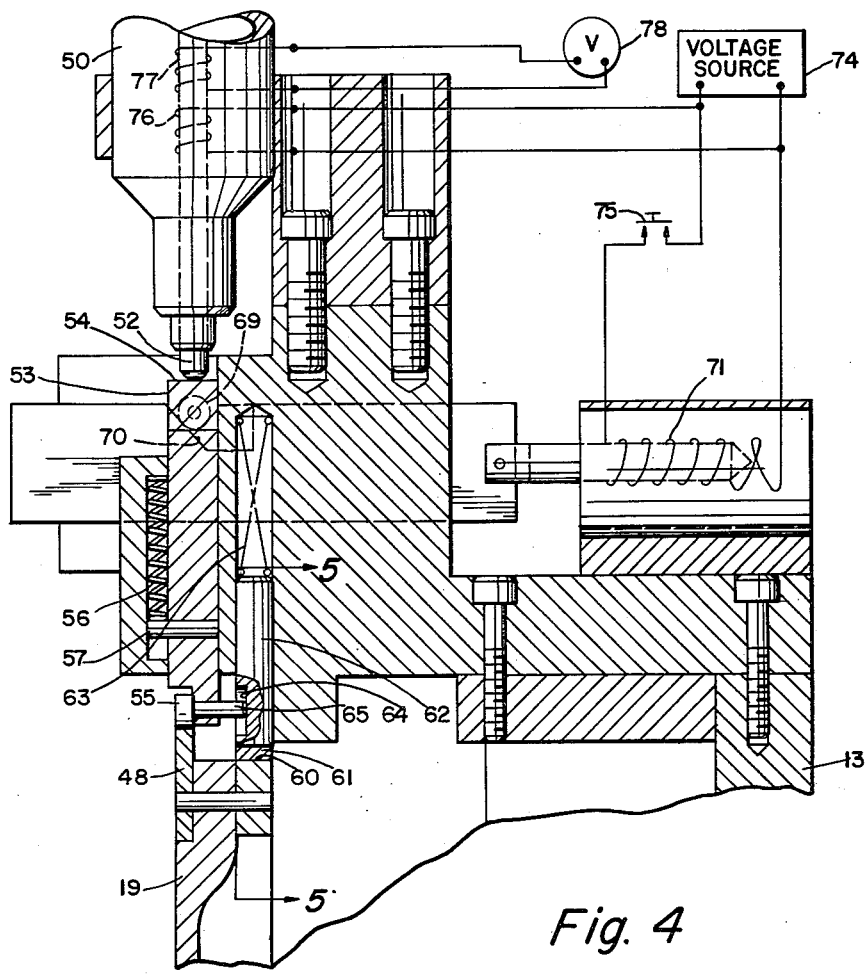
FIGURE 4 is an enlarged side elevational view of part of FIGURE 1 and including a schematic electrical diagram.
Figure 5:
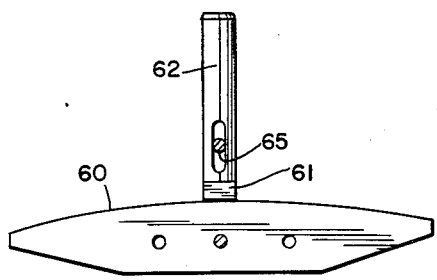
FIGURE 5 is a sectional view on line 5—5 of FIGURE 4.

The FIGURE 4 shows schematically an electrical diagram useable with the present invention and includes a voltage source 74 which may energize the solenoid 71 through a push-button switch 75. This voltage source 74, or another suitable source, is connected to energize a primary winding 76 in the linear variable differential transformer 50. A secondary 77 of this transducer 50 is connected to a voltage-indicating device or voltmeter 78.

*Operation*

The entire moment determining device 11 is a precision instrument capable of determining moments of objects within .05 ounce-inches, for a total moment in the order of 25–100 ounce-inches. The transverse axis 29 is horizontal within manufacturing tolerances when the axis of the arm 19 is vertical and this transverse axis 29 extends through the center of gravity of the object 25 and the center of gravity of the counterpoise 32, and also extends through the pivot means 17—18. The pendulum 21 has sufficiently greater mass than the upwardly extending arm 19 so that the center of gravity of the entire beam scale is below the pivot means 17—18 for static equilibrium. It will be noted that because of the pendulum 21, whenever the beam 15 moves from its horizontal position, the mass of the pendulum 21 attempts to oppose this movement. Accordingly, the device 11 is inherently stable. As stated above, the counterpoise 32 counterbalances the weight of the clamp bracket 23 and the adjustable counterpoise 33 counterbalances the weight of the median weight of a group of objects 25. The adjustable pendulum weights 42 and 43 cooperate with the mass of the pendulum 21 to correctly calibrate the entire device dependent on the curvature of the cam surface 48. The linear variable differential transformer 50 is a mechanical-electrical transducer which has a longitudinally movable core 52 therein and the electrical output at the secondary 77 is directly proportional to the longitudinal placement of the core within the transducer 50. The mass of the pendulum 21, the adjustable pendulum 42—43, the counterpoises 32 and 33, the clamp bracket 23 and the object 25, together have a center of gravity below the pivot means 17—18. Also it may be considered that the mass of the pendulum 21, the adjustable pendulum 42—43 and the counterpoises 32 and 33 have a center of gravity which is below the pivot means 17—18 and acts on the beam 15 on the side opposite to the clamp bracket 23.

An object 25 may be easily inserted into the clamp bracket 23 by sliding the root section therein and the leaf spring 28 readily holds this object 25 in place. The push-button switch 75 may be depressed and this energizes the solenoid 71 to a first condition. This moves the lifter cam 70 to the right as viewed in FIGURE 4. Accordingly, the lifter roller 69 is moved upwardly to move the slide block 53 upwardly. This moves the core 52 to its upper extreme position and separates the cam follower roller 55 from the cam 48. This movement is also sufficient to take up the lost motion connection at 64—65 and accordingly the brake plunger 62 is moved upwardly to release the brake means 60—61. This movement has released all frictional resistance to movement of the arm 19 and accordingly the beam 15 will pivot on the pivot means 17—18 in accordance with the moment of the object 25. This device 11 takes into account the different moments of the objects 25 rather than merely the weights because the objects are not hung from a knife edge, such as knife edge 45, at a fixed distance from the pivot means 17—18. Rather the clamp means 23 holds only the root section of the turbine blade 25 at a fixed distance from the pivot means 17—18 and therefore, if the distribution of material in the object 25 is such as to provide a different center of gravity between two different objects, then these two objects will have different moments and the beam 15 will move to different positions in accordance therewith. The greater the moment of the object 25 in excess of the median, the more the left end of the beam 15, as viewed in FIGURE 1, will be depressed below the horizontal. This increased deflection of the beam 15 will be counterbalanced by the fact that the pendulum 21 has moved off the vertical axis 51 and a new position of static equilibrium will be obtained. The arm 19 and the cam surfaces 48 will thus move to a position in accordance with the moment of the object 25. Movement of the beam 15 is, of course, damped by the dashpot 38.

The switch 75 may be opened and this de-energizes the solenoid 71 which is spring-biased to return to a second or de-energized condition. Thus, the lifter cam 70 moves to the left as viewed in FIGURE 4 and this permits the lifter roller 69 to move downwardly. Accordingly the brake means 60—61 is engaged to hold the arm 19 in that particular position and then the cam follower roller 55 engages the cam surface 48. This means that the core 52 has taken a definite longitudinal position in the transducer 50. The secondary 77 therefore has an output voltage directly in accordance with the moment of the object 25 and is electrically indicated on the voltmeter 78. This output voltage may be utilized in any number of ways on various types of voltage indicating devices and, merely as one example, the voltmeter 78 may be calibrated directly in ounce-inches.

The cam 48 and cam follower 55 is a linkage means to link the mechanical movement of the beam 15 to the mechanical input at the core 52 of the transducer 50. The entire transducer 50, voltmeter 78, and movable core 52 comprise a movable indicator means actuated by the linkage means shown as the cam 48 and cam follower 55. The solenoid 71 is a power means to actuate the lifter cam 70 and accordingly to separate the cam follower roller 55 and cam 48, and also to separate the brake shoe 61 from the brake surface 60.

The cam 48 is shown as being fixed on the arm 19 and the cam follower 55 is on the slide block 53. This therefore establishes relative movement between the cam and cam follower in accordance with movement of the beam 15 and, as such, one of the cam and follower is carried on the arm 19 and the other is carried on the slide block 53.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A moment determining device, comprising in combination, a frame, pivot means on said frame, a beam mounted on said pivot means, means on said beam on one side of said pivot means to mount an object at a fixed distance from said pivot means for determining the moment thereof, means on said beam on the other side of said pivot means to counterbalance the median weight of a group of objects of slightly different moments and having a center of gravity below a horizontal line through said pivot means, movable indicator means on said frame, a cam and follower, one of said cam and follower moved in accordance with movement of said beam and the other connected to move said indicator means, said indicator means indicating the moment of an object in said mounting means.

2. A moment determining device, comprising in combination, a frame, pivot means on said frame, a beam mounted on said pivot means, means on said beam on one side of said pivot means to mount an object for determining the moment thereof, means on said beam on the other side of said pivot means to counterbalance the median weight of a group of objects and having a center of gravity below a horizontal line through said pivot means, a mechanical-electrical transducer on said frame and having a movable core, linkage means to move said core in accordance with movement of said beam, power means having first and second conditions and connected to actuate said linkage means, means to actuate said power means to said first condition whereat said linkage means is disengaged, means to actuate said power means to said second condition whereat said linkage means is engaged and whereby said transducer core has a position corresponding to the moment of the particular object, means to apply an electrical input signal to said transducer, said transducer having an electrical output in accordance with the position of said core, and the electrical output of said transducer indicating the moment of an object on said mounting means.

3. A moment determining device, comprising in combination, a frame, pivot means on said frame, a beam mounted on said pivot means, means on said beam on one side of said pivot means to mount an object for determining the moment thereof, means on said beam on the other side of said pivot means to counterbalance the median weight of a group of objects of slightly different moments and having a center of gravity below a horizontal line through said pivot means, a mechanical-electrical transducer on said frame and having a movable core, a cam and follower, one of said cam and follower moved in accordance with movement of said beam and the other connected to move said core, means to apply an electrical input signal to said transducer, said transducer having an electrical output in accordance with the position of said core, and the electrical output of said transducer indicating the moment of an object in said mounting means.

4. A moment determining device, comprising in combination, a frame, pivot means on said frame, a beam mounted on said pivot means, means on said beam on one side of said pivot means to mount an object for determining the moment thereof, means on said beam on the other side of said pivot means to counterbalance the median weight of a group of objects of slightly different moments and having a center of gravity below a horizontal line through said pivot means, a transducer on said frame and comprising a linear variable differential transformer, a movable core in said transducer, a cam and follower, one of said cam and follower moved in accordance with movement of said beam and the other connected to move said core, power means having first and second conditions and connected to actuate said other of said cam and follower, means to actuate said power means to said first condition whereat said cam follower is separated from said cam and whereby an object may be placed in said mounting means and said beam will come to rest in a position determined by the moment of that particular object, means to actuate said power means to said second condition whereat said cam follower is in engagement with said cam and whereby said transducer core has a position corresponding to the moment of said particular object, and the electrical output of said transducer indicating the moment of that particular object.

5. A moment determining device, comprising in combination, a frame, pivot means on said frame, a beam mounted on said pivot means, means on said beam on one side of said pivot means to mount an object at a fixed distance from said pivot means for determining the moment thereof, means on said beam on the other side of said pivot means to counterbalance the median weight of a group of objects of slightly different moments and having a center of gravity below a horizontal line through said pivot means, a transducer on said frame and comprising a linear variable differential transformer, a movable core in said transducer, a cam and follower, one of said cam and follower moved in accordance with movement of said beam and the other connected to move said core, solenoid means having first and second conditions and connected to actuate said other of said cam and follower, means to actuate said solenoid means to said first condition whereat said cam follower is separated from said cam and whereby an object may be placed in said mounting means and said beam will come to rest in a position determined by the moment of that particular object, means to actuate said solenoid means to said second condition whereat said cam follower is an engagement with said cam and whereby said transducer core has a position corresponding to the moment of said particular object, means to apply an electrical input signal to said transducer, said transducer having an electrical output in accordance with the position of said core, and the electrical output of said transducer indicating the moment of that particular object.

6. A moment determining device, comprising in combination, a frame having a vertical axis, pivot means on said frame, a beam mounted on said pivot means, means on said beam on one side of said pivot means to mount an object for determining the moment thereof, counterpoise means on said beam on the other side of said pivot means to counterbalance the median weight of a group of objects of slightly different moments, the centers of gravity of said counterpoise means and said mounting means establishing a transverse axis, means including said counterpoise means and said mounting means to establish a weight having a center of gravity below said pivot means when said transverse axis is horizontal, a transducer on said frame and comprising a linear variable differential transformer, a movable core in said transducer, a cam and follower, one of said cam and follower fixedly carried relative to said beam and the other connected to move said core, solenoid means having first and second conditions and connected to actuate said other of said cam and follower, means to actuate said solenoid means to said first condition whereat said cam follower is separated from said cam and whereby an object may be placed in said mounting means and said beam will come to rest in a position determined by the moment of that particular object, means to actuate said solenoid means to said second condition whereat said cam follower is in engagement with said cam and whereby said transducer core has a postion corresponding to the moment of said particular object, and said transducer having an electrical output in accordance with the position of said core and hence of the moment of that particular object.

7. A moment determining device, comprising in combination, a frame having a vertical axis, pivot means on said frame, a beam mounted on said pivot means, means on said beam on one side of said pivot means to mount an object for determining the moment thereof, counterpoise means on said beam on the other side of said pivot means to counterbalance the median weight of a group of objects of slightly different moments, means including said counterpoise means and said mounting means to establish a weight having a center of gravity below said pivot means when a transverse axis through the centers of gravity of said counterpoise means and said mounting means is horizontal, an arm fixedly carried on said beam, a transducer on said frame and comprising a linear variable differential transformer, a movable core in said transducer, a cam and follower, one of said cam and follower carried on said arm and the other connected to move said core, solenoid means having first and second conditions and connected to actuate said other of said cam and follower, means to actuate said solenoid means to said first condition whereat said cam follower is separated from said cam and whereby an object may be placed in said mounting means and said beam will come to rest in a position determined by the moment of that particular object, means to actuate said solenoid means to said second condition whereat said cam follower is in engagement with said cam and whereby said transducer core has a position corresponding to the moment of said particular object, means to apply an electrical input signal to said transducer, said transducer having an electrical output in accordance with the position of said core, and the electrical output of said transducer indicating the moment of that particular object.

8. A moment determining device, comprising in combination, a frame having a vertical axis, pivot means on said frame, a beam mounted on said pivot means, clamp means on said beam on one side of said pivot means to mount an object for determining the moment thereof, counterpoise means on said beam on the other side of said pivot means to counter-balance the median weight of a group of objects of slightly different moments, means including pendulum means and said counterpoise means and said clamp means to establish a weight having a center of gravity below said pivot means when a transverse axis through the centers of gravity of said counterpoise means and said clamp means is horizontal, an arm fixedly carried on said beam, a slide on said frame, movable indicator means on said frame, connected to be moved by said slide, a cam and follower, one of said cam and follower carried on said arm and the other carried on said slide, solenoid means having first and second conditions and connected to actuate said slide, means to actuate said solenoid means to said first condition whereat said cam follower is separated from said cam and whereby an object may be placed in said clamp means and said beam will come to rest in a position determined by the moment of that particular object, means to actuate said solenoid means to said second condition whereat said cam follower is in engagement with said cam and whereby said movable indicator means has a position corresponding to the moment of said particular object.

9. A moment determining device, comprising in combination, a frame having a vertical axis, pivot means on said frame, a beam mounted on said pivot means, clamp means on said beam on one side of said pivot means to mount an object for determining the moment thereof, counterpoise means on said beam on the other side of said pivot means to counterbalance the median weight of a group of objects of slightly different moments, means including pendulum means and said counterpoise means and said clamp means to establish a weight having a center of gravity below said pivot means when a transverse axis through the centers of gravity of said counterpoise means and said clamp means is horizontal, an arm fixedly carried on said beam, a slide on said frame, a transducer on said frame and comprising a linear variable differential transformer, a movable core in said transducer connected to be moved by said slide, a cam and follower, one of said cam and follower carried on said arm and the other carried on said slide, solenoid means having first and second conditions and connected to actuate said slide, means to actuate said solenoid means to said first condition whereat said cam follower is separated from said cam and whereby an object may be placed in said clamp means and said beam will come to rest in a position determined by the moment of that particular object, means to actuate said solenoid means to said second condition whereat said cam follower is in engagement with said cam and whereby said transducer core has a position corresponding to the moment of said particular object, means to apply an electrical input signal to said transducer, said transducer having an electrical output in accordance with the position of said core, and the electrical output of said transducer indicating the moment of that particular object.

10. A moment determining device, comprising in combination, a frame having a vertical axis, pivot means on said frame, a beam mounted on said pivot means, clamp means on said beam on one side of said pivot means to mount a turbine blade, counterpoise means on said beam on the other side of said pivot means to counterbalance the median weight of a group of turbine blades of slightly different moments, means including pendulum means and said counterpoise means and said clamp means to establish a weight having a center of gravity below said pivot means when a transverse axis through the centers of gravity of said counterpoise means and said clamp means is horizontal, an arm fixedly carried on said beam, a slide on said frame, a transducer on said frame and comprising a linear variable differential transformer, a movable core in said transducer connected to be moved by said slide, a cam and follower, one of said cam and follower carried on said arm and the other carried on said slide, brake means actuable with said slide and cooperable with said arm, solenoid means having first and second positions and connected to actuate said slide, means to actuate said solenoid means to said first position whereat said cam follower is separated from said cam and said brake means is released, whereby a turbine blade may be placed in said clamp means and said beam will come to rest in a position determined by the moment of that particular turbine blade, means to actuate said solenoid means to said second position whereat said brake means is engaged and said cam follower is in engagement with said cam, whereby said transducer core has a position corresponding to the moment of said particular turbine blade, means to apply an electrical input signal to said transducer, said transducer having an electrical output in accordance with the position of said core, and the electrical output of said transducer indicating the moment of that particular turbine blade.

11. A moment determining device, comprising in combination, a frame having a vertical axis, pivot means on said frame, a beam mounted on said pivot means, clamp means on said beam on one side of said pivot means to mount a turbine blade, counterpoise means on said beam on the other side of said pivot means to counterbalance the median weight of a group of turbine blades of slightly different moments, means including pendulum means and said counterpoise means and said clamp means to establish a weight having a center of gravity below said pivot means when a transverse axis through the centers of gravity of said counterpoise means and said clamp means is horizontal, an arm fixedly carried on said beam, a cam having a cam surface and fastened on said arm with said cam surface being other than on a radius from said pivot means, an arcuate brake surface on said arm on a radius from said pivot means, a slide on said frame, a transducer on said frame and comprising a linear variable differential transformer, a movable core in said transducer connected to be moved by said slide, a cam follower roller on one end of said slide and adapted to cooperate with said cam surface, brake means actuable with said slide and cooperable with said brake surface, solenoid means having first and second positions and connected to actuate said slide, means to actuate said solenoid means to said first position whereat said cam follower roller is separated from said cam surface and said brake means is released, whereby a turbine blade may be placed in said clamp means and said beam will come to rest in a position determined by the moment of that particular turbine blade, means to actuate said solenoid means to said second position whereat said brake means is engaged and said cam follower roller is in engagement with said cam surface, whereby said transducer core has a position corresponding to the moment of said particular turbine blade, means to apply an electrical input signal to said transducer, said transducer having an electrical output in accordance with the position of said core, and means to electrically indicate the moment of that particular turbine blade in accordance with the electrical output of said transducer.

12. A moment determining device, comprising, a frame having a vertical axis, a beam scale, pivot means mounting said beam scale on said frame at said vertical axis, clamp means on one end of said beam scale to mount a turbine blade, counterpoise means on the other end of said beam scale to counterbalance the median weight of a group of turbine blades, pendulum means fixedly connected to said beam scale and having its axis on said vertical axis when said beam scale is horizontal, said beam scale adjacent said frame, a cam having a cam surface and fastened on said arm with said cam surface being other than on a radius from said pivot means, an arcuate brake surface on said arm on a radius from said pivot means, a slide on said frame, a linear variable differential transformer transducer mounted on said frame, a movable core in said transducer connected to be moved by said slide, a cam follower roller on one end of said slide and adapted to cooperate with said cam surface, brake means actuable with said slide and cooperable with said brake surface, solenoid means to actuate said slide, means to control said solenoid means to actuate said slide to a first position whereat said cam follower roller is separated from said cam surface and said brake means is released and to actuate said slide to a second position whereat said cam follower roller is in engagement with said cam surface and said brake means is engaged, means to apply an electrical input signal to said transducer, said transducer having an electrical output in accordance with the position of said cam, and hence, of said beam scale, and means to electrically indicate the moment of a turbine blade in said clamp means in accordance with the electrical output of said transducer.

13. A moment determining device, comprising, a frame having a vertical axis, a beam scale, pivot means mounting said beam scale on said frame at said vertical axis, clamp means on one end of said beam scale to mount a turbine blade, counterpoise means on the other end of said beam scale to counterbalance the median weight of a group of turbine blades, pendulum means fixedly connected to said beam scale and having its axis on said vertical axis when said beam scale is horizontal, an arm fixedly carried on said beam scale adjacent said frame, a cam having a cam surface and fastened on said arm with said cam surface being other than on a radius from said pivot means, an arcuate brake surface on said arm on a radius from said pivot means, a slide on said frame, a transducer mounted on said frame, said transducer comprising a linear variable differential transformer, a movable core in said transducer connected to be moved by said slide, a cam follower roller on one end of said slide and adapted to cooperate with said cam surface, a brake shoe movable with said slide and cooperable with said brake surface, solenoid means to move said slide to a first position whereat said cam follower roller is separated from said cam surface and said brake shoe is separated from said brake surface, means to control said solenoid to actuate said slide to a second position whereat said cam follower roller is in engagement with said cam surface and said brake shoe engages said arcuate brake surface, means to apply an electrical input signal to said transducer, said transducer having an electrical output in accordance with the position of said cam, and hence, of said beam scale, and means to electrically indicate the moment of a turbine blade in said clamp means in accordance with the electrical output of said transducer.

14. A moment determining device, comprising, a frame, a column having a vertical axis mounted on said frame, a beam scale, pivot means mounting said beam scale on said frame at said vertical axis, clamp means on one end of said beam scale to mount a turbine blade, counterpoise means on the other end of said beam scale to counterbalance the median weight of a group of turbine blades, pendulum means fixedly connected to said beam scale and having its axis on said vertical axis when said beam scale is horizontal, a vertically extending arm extending upwardly from said beam scale adjacent said column, a cam having an upper cam surface and fastened on said arm with said cam surface being other than on a radius from said pivot means, an arcuate brake surface on said arm on a radius from said pivot means, a vertical slide on said column, a transducer mounted on said column, said transducer comprising a linear variable differential transformer having a vertical axis, a vertically movable core in said transducer engageable with the upper end of said slide, a cam follower roller on the lower end of said slide and adapted to cooperate with said cam surface, a brake shoe movable with said slide and cooperable with said brake surface, solenoid means to raise said slide to a first position whereat said cam follower roller is separated from said cam surface and said brake shoe is separated from said brake surface, means to control said solenoid to actuate said slide to a second position whereat said cam follower roller is in engagement with said cam surface and said brake shoe engages said arcuate brake surface, means to apply an electrical input signal to said transducer, said transducer having an electrical output in accordance with the position of said cam, and hence, of said beam scale, and means to electrically indicate the moment of a turbine blade in said clamp means in accordance with the electrical output of said transducer.

15. A moment determining device, comprising, a frame, a column having a vertical axis mounted on said frame, a beam scale, knife edge means mounting said beam scale on said frame at said vertical axis, clamp means on one end of said beam scale to mount a turbine blade, counterpoise means on the other end of said beam scale to counterbalance the median weight of a group of turbine blades, a main pendulum fixedly connected below said beam scale and having its axis on said vertical axis when said beam scale is horizontal, a compensating pendulum on said beam scale, a vertically extending arm extending upwardly from said beam scale adjacent said column, a cam having an upper curved surface and fastened on said arm with said curved cam surface being other than on a radius from said knife edge, an arcuate brake surface on said arm on a radius from said knife edge, a vertical slide on said column, a transducer mounted on said column, said transducer comprising a linear variable differential transformer having a vertical axis, a vertically movable core in said transducer engageable with the upper end of said slide, a cam follower roller on the lower end of said slide and adapted to cooperate with said cam surface, a brake shoe urged by spring means into cooperation with said brake surface, a lost motion connection between said slide and said brake shoe, a lifter cam to lift said slide, solenoid means to actuate said lifter cam to raise said slide to a first position whereat said cam follower roller is separated from said cam surface and said brake shoe is separated from said brake surface, means to control said solenoid to actuate said slide to a second position whereat said cam follower roller is in engagement with said cam surface and said brake shoe engages said arcuate brake surface, means to apply an electrical input signal to said transducer, said transducer having an electrical output in accordance with the position of said cam, and hence, of said beam scale, and means to electrically indicate the moment of a turbine blade in said clamp means in accordance with the electrical output of said transducer.

References Cited in the file of this patent

UNITED STATES PATENTS

| | | |
|---|---|---|
| 2,060,904 | Smith | Nov. 17, 1936 |
| 2,735,299 | Blackburn et al. | Feb. 21, 1956 |
| 2,782,631 | Baltrukonis et al. | Feb. 26, 1957 |
| 2,929,679 | Bryan et al. | Mar. 22, 1960 |
| 2,950,784 | Hertel | Aug. 30, 1960 |